3,701,765
ANTISTATIC MOLDING COMPOSITIONS

Karl-Heinz Magosch and Konrad Rombusch, Marl, and Ursula Eichers, Recklinghausen, Germany, assignors to Chemische Werke Huls A.G., Marl, Germany
No Drawing. Filed Oct. 28, 1970, Ser. No. 84,886
Claims priority, application Germany, Oct. 29, 1969, P 19 54 291.7; Jan. 19, 1970, P 20 02 095.5
Int. Cl. C08f 29/02, 29/04
U.S. Cl. 260—93.7     23 Claims

ABSTRACT OF THE DISCLOSURE

Antistatic polyolefin molding compositions and articles containing 0.01–5.0% by weight of an antistat of the formula:

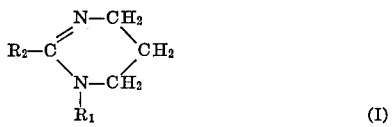

wherein $R_1$ is hydrogen, alkyl or alkenyl of 1–5 carbon atoms, or a group of the formula $(C_xH_{2x}O)_nH$ in which $x$ is 2 or 3 and $n$ is 1–10, and wherein $R_2$ is straight chain or branched alkyl or alkenyl of 5–25 carbon atoms, inclusive.

BACKGROUND OF THE INVENTION

This invention relates to antistatic polyolefin molding compositions and shaped articles thereof.

Polyolefin products tend to attract dust to a large degree during storage and use as a result of electrostatic charging, which considerably diminishes their utility value. Various means have been suggested to avoid these difficulties. Thus, it is possible to coat the surfaces of shaped polyethylene articles with a material which thus reduces electrostatic charging. However, such processes usually have the disadvantage that the effectiveness is lost as soon as the antistatic coating is worn off by use or cleaning. A more lasting effect is attained by incorporating the antistatic additive into the polymeric substance, and producing shaped articles from these mixtures. Among this group of additives belong, for example, quaternary ammonium salts, polyalkylene glycols, and polyalkylene glycol esters.

Better results are achieved with oxyethylates of alkanols and alkylaryl phenols. (See Belgian Pat. 536,623 and British Pat. 731,728). However, these compounds tend to bleed out when incorporated into the plastic article in an amount sufficient to achieve a satisfactory effect.

A further increase in antistatic effectiveness can be obtained employing nitrogen-containing compounds, such as, for example, amides and aminocarboxylic acid derivatives (French Pats. 1,377,803–808), oxazolines, and imidazolines, and, to a still greater extent, with alkylamines (Belgian Pats. 655,182 and 655,183), especially oxyethylates of alkylamines (Belgian Pat. 645,800; French Pats. 1,345,-827 and 1,322,626; German published application DAS 1,228,056), the bishydroxyethyl derivatives being the most effective antistatics of all those described heretofore. However, these compounds often have the disadvantage that, in the first few days after the manufacture of the molded polyolefin article, film, filament or fiber, the additive does not immediately achieve its full antistatic effectiveness. The term "molded articles" as used herein means the shaped, compact products of injection-molding, extrusion, and deep-drawing processes, as distinguished from films, filaments and fibers. The result is that the electrostatic charge which develops during processing and which generally is very high, for example during separation from the mold in injection molding processes, cannot dissipate immediately, so that, within a few days, the molded articles become unattractive due to dust attraction. The situation is aggravated by the large amount of dust usually present in factory workshops.

A special problem is presented in the antistatic treatment of films, threads and fibers of polyolefins. It is known to those skilled in the art that, in order to obtain an antistatic effectiveness, it is important that the surface of the molded articles be coated with the antistat compound. This surface coating is considerably smaller in case of threads and fibers than in case of injection-molded, extruded, and deep-drawn articles, after admixing the same amount by weight of antistat, due to the fact that the surface area of threads and fibers is very large as related to the weight thereof. Accordingly, it is to be expected that the effectiveness of an antistatic agent in threads and fibers commences only after uneconomically large amounts have been added thereto. Such a behavior is also usually observed.

Consequently, there is a special need for antistatic agents which become effective in fibers already at low amounts of addition. Especially valuable would be an agent of this type which protects, in the same range of concentration, compact molded articles as well as fibers, so that it is possible to utilize the same molding composition for a great variety of manufacturing fields.

A large number of 2-fatty alkyl oxazolines and imidazolines, as well as the N-derivatives thereof, are described in the patent literature. In contrast thereto, of the tetrahydropyrimidines, there are disclosed only specific esters with other heterocyclic compounds, for example (U.S. 3,020,276):

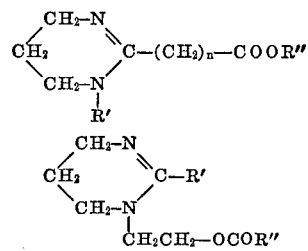

wherein $R'$ is alkyl as $C_{12}H_{25}$ and $R''$ is

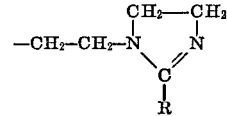

with R=alkyl as $C_5H_{11}$ or $C_{17}H_{33}$.

Copolymers of acrylic or vinyl compounds and N-vinyl tetrahydropyrimidines are also known (Belgian Pat. 625,-362).

From this state of the art, one skilled in the art would conclude that only complicated tetrahydropyrimidines are effective as antistatic compounds whereas the simple tetrahydropyrimidines, e.g., 2-fatty-alkyl derivatives would be ineffective.

Thus, the problem existed of rendering polyolefins antistatic which had the advantages provided by the amine antistatic agents, without the above-mentioned disadvantages of delayed effectiveness and the use of structurally complicated compounds which are not readily accessible.

SUMMARY OF THE INVENTION

According to this invention, polyolefins are rendered antistatic without the above-described disadvantages associated with the prior art methods, by incorporating therein from 0.01–5.0% by weight, based on the polyolefin, of a compound of the formula:

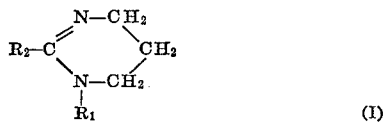 (I)

wherein $R_1$ is hydrogen, alkyl or alkenyl of 1–5 carbon atoms, or a group of the formula $(C_xH_{2x}O)_nH$ in which $x$ is 2 or 3 and $n$ is 1–10, and wherein $R_2$ is straight chain or branched alkyl or alkenyl of 5–25 carbon atoms, inclusive. Optionally, an equivalent amount of an organic or inorganic acid can also be incorporated therein.

DETAILED DISCUSSION

Polyolefins which can be rendered antistatic according to this invention include high- and low-pressure polymers of ethylene, propylene, butene-1, pentene-1, etc., especially polyethylenes of a molecular weight from 20,000 to 150,000, polypropylenes of molecular weights from 100,000 to 800,000, polybutenes-1 of molecular weights from 300,000 to 3,000,000, polypentenes-1, and copolymers and mixtures thereof.

Tetrahydropyrimidines of Formula I which can be employed in accordance with this invention are those wherein $R_1$ is hydrogen, alkyl or alkenyl, preferably alkyl of 1–5, preferably 1–2, carbon atoms, inclusive, or a group of the formula $(C_xH_{2x}O)_nH$ in which $x$ is the integer 2 or 3, preferably 2, and $n$ is an integer from 1–10, preferably 1–3, inclusive, especially 1; and $R_2$ is straight-chain or branched alkyl or alkenyl, for example of 5–25, preferably 7–17, especially 9–13, carbon atoms, inclusive.

Specific examples of groups wherein $R_1$ is alkyl or adkenyl are propyl, n-butyl, isobutyl, and butenyl. Preferred are the methyl and ethyl. Specific examples of groups wherein $R_1$ is $(C_xH_{2x}O)_nH$ are —$CH_2CH_2OH$,

—$CH_2CH_2CH_2OH$, —$CH_2CH(CH_3)OH$

—$(CH_2CH_2O)_2H$, —$(CH_2CH_2O)_3H$, —$(CH_2CH_2O)_5H$, etc.

Examples of $R_2$ are n-heptyl, n-octyl, trimethylpentyl, n-nonyl, n-undecyl, n-undecenyl, isotridecyl, n-tetradecyl, n-pentadecyl, n-heptadecenyl, and n-heptadecyl. Preferred are n-nonyl, n-decyl, n-undecenyl, n-undecyl, n-dodecyl, n-tridecyl, isotridecyl and mixtures thereof, such as, for example, a mixture of compounds in which $R_2$ is $C_9$- to $C_{13}$-alkyl.

Examples of specific compounds are 1-methyl-2-heptadecyltetrahydropyrimidine, 2 - pentacosyl - tetrahydropyrimidine, 1 - n - butyl - 2 - n - hexyl - tetrahydropyrimidine, 1-ethyl-2-heptadecenyltetrahydropyrimidine, 1-β-hydroxypropyl - 2 - (α - ethyl) - pentyltetrahydropyrimidine; the condensation product of palmitic acid and $H_2N(CH_2)_3$—NH—$(CH_2CH_2O)_{10}H$; the condensation product of caproic acid and

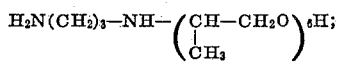

and 1 - propenyl - 2 - heptadecenyltetrahydropyrimidine. Especially suitable are 1 - ethyl - 2 - undecyl - tetrahydropyrimidine, 1 - hydroxyethyl - 2 - undecyl - tetrahydropyrimidine, and mixtures of 1 - methyl - 2 - alkyl - tetrahydropyrimidines in which the 2-alkyl group is a fatty alkyl group varying from 9 to 13 carbon atoms, inclusive.

The compounds of Formula I are conventionally obtained by reacting correspondingly substituted 1,3-propanediamines with carboxylic acids or the derivatives thereof, such as, for example, esters or nitriles. Advantageously, the starting materials are carboxylic acids and 1,3-propanediamines, and the thus-produced water (2 mols per mole of tetrahydropyrimidine) is azeotropically removed from the reaction mixture, the entraining agent preferably being xylene.

In addition to the above method, other methods are known which, however, are not of any practical importance.

The tetrahydropyrimidines can be employed in free base form or in the form of acid addition salts, e.g., of mono- and dicarboxylic acids, such as, for example, acetic acid, lauric acid, oleic acid, oxalic acid, tartaric acid, succinic acid and 1,12-dodecanedioic acid; hydroxycarboxylic acids, such as, for example, lactic acid, glycolic acid, and ricinoleic acid; inorganic acids, e.g., sulfuric acid, and partial alkyl esters thereof; sulfonic acids, such as, for example, $C_{15}$-alkane- and $C_{12}$-alkylbenzenesulfonic acids, whereby the basic character of the compounds is lowered or eliminated.

Examples of such salts are 1 - ethyl - 2 - undecyl - tetrahydropyrimidine and lactic acid; the salt of 1-hydroxyethyl - 2 - tetradecyl - tetrahydropyrimidine and lauric acid; and the salt of 1-butyl-2-nonyl-tetrahydropyrimidine and phosphoric acid.

The salts can be prepared by converting the mixture of equimolar amounts of one or more tetrahydropyrimidines and one or more carboxylic acids, optionally with heating, into a homogeneous melt by vigorous stirring. The mixture, if hot, is allowed to cool. Alternatively, both components in suitable solvents can be mixed and the combined solutions evaporated to dryness, which procedure avoids the danger of discoloration of the thus produced salt.

The amounts of the above-disclosed antistatics incorporated into the polyolefins range is usually from 0.01 to 5.0% by weight, based on the polyolefin. Preferred are amounts of from 0.1 to 1.0% by weight, since these amounts provide complete protection against dust accumulation by electrostatic attraction even in case of very dry and warm air, without appreciably impairing the crack resistance of the highly crystalline types of polyolefins. If lower concentrations are employed, for example, 0.005 to 0.009%, based on the polyolefin, the protection against electrostatic charging is substantially lower. Such protection, although insufficient for dry air, may still be sufficient when the polyolefin is stored in moist air. Higher concentrations than 5.0% are normally unnecessary since they do not result in any further improvement in antistatic properties.

The novel additives can be introduced into the polyolefin in various ways. For example, the polyolefin and the antistatic agent can be directly converted into a homogeneous mass in a mixer. For this purpose, generally any commercially available high-speed mixer is suitable. It is also possible first to admix in the polyolefin a percentage of the antistatic which is higher than desired, and then provide the desired content of antistatic in this mixture by admixing additional polyolefin lacking the antistatic agent. It is also possible to dissolve, disperse, suspend, or emulsify the antistatic agent in a suitable organic solvent, add the solution, dispersion, suspension, or emulsion to the powdered polyolefin, and vigorously stir the resulting mixture. The solvent can then be removed, for example, by distillation. A solvent well suited for these purposes is methanol. However, all other readily distillable solvents for the antistatic agent are suitable for this purpose as well. It is also possible to incorporate the antistatic agent into the polyolefin directly on the rolling mill or , for example, during injection molding in an extruder, e.g., a screw injection molding machine, or in a spinning extruder.

It is particularly advantageous to produce a granulated polyolefin having a higher than desired concentration of antistat agent, and then reducing to the desired level the antistat content during processing, e.g., by admixing thereto granulated polyolefin which is free of additive.

Other additives can be added which are customarily employed in plastics processing, for example, pigments, stabilizers, plasticizers, extenders, and fillers, as well as slip agents.

In the case of fibers and filaments, incorporation and homogenization can also be conducted advantageously with the simultaneous addition of 0.01–3.0% by weight, based on the polyolefin, of other conventional antistats, for example, polyethylene and polypropylene glycols, polyols, such as glycerin, as well as the monoethers and monoesters, diethers and diesters, and ether esters thereof, and likewise alkylamines and fatty acid amides.

Thus, there can be incorporated into the polyolefin an additional substance which prevents the slight yellowing of the antistats which can occur during prolonged processing at high temperatures. Suitable such stabilizers are, for example, phosphites, especially didecylphenyl phosphite, decyldiphenyl phosphite, triphenyl phosphite, tris (nonylphenyl) phosphite, tris(nonylphenol+9 mols ethylene oxide) phosphite. These compounds are usually added in amounts of from 0.01 to 1.0% by weight, based on the polyolefin. Also, the addition of an alkanesulfonate, e.g., sodium pentadecanesulfonate, is of advantage. For this purpose, approximately 0.05 to 2.0% by weight is required, based on the polyolefin.

The claimed additives are highly effective immediately after the manufacture of the molded article, without forming a troublesome film on the surface of the molded article. This is surprising especially since all analogous compounds previously disclosed as being highly effective antistats for this application, whether open-chain or cyclic, i.e., carboxylic acid amides, imides, and amidines; oxazolines; and imidazolines are substantially inferior with respect to antistatic effectiveness and diffusion rate, compared to the compounds of this invention, so much so they seldom have been employed in commercial applications.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

The antistatic behavior of the molded articles was determined by the ash dust testing method in which data as to the dust accumulation to which the test bodies are exposed (a) in a normal atmosphere (normal dust accumulation) and (b) when being sprinkled with a special powder (color powder test); and by measuring the surface resistance according to German Industrial Standard DIN 53,482 VDE 0303, Part 3. These tests were conducted on test dishes having an edge length of 42 x 250 x 320 mm.

The ash dust test was conducted in the following manner: One hour after producing the test body, it was rubbed ten times vigorously with, in each case, fresh cellulose and then fresh, crushed cigarette ash held 0.5 cm. above the surface. The results of the test are designated as follows:

Test body does not attract any ash particles ___ +
Minor ash attraction _____ (+)
Medium ash attraction _____ (+ —)
Moderately strong ash attraction _____ (—)
Strong ash attraction _____ —

The test is repeated 24 hours and 8 days after manufacture.

In the normal dust accumulation test, the test results are classified semiquantitatively as none, very light, light, medium, strong, and very strong dust accumulation, observed 8 days after manufacture.

The color powder test, which is conducted one hour, 24 hours, and 8 days after the manufacture of the molded articles, determines how strongly, as determined by the degree of color separation, of the two components of a mixture of red-dyed sublimed sulfur and blue-dyed lycopodium spores are attracted by different areas of the surface of the plastic, the red areas identifying zones of positive charging and the blue areas identifying zones of negative charging on the surface of the plastic. The asterisk in parentheses ((*)) means Lichtenberg figures were observed.

TABLE I

| Example No.[1] | Polyolefin | Percent by weight | Antistat |
|---|---|---|---|
| 1 | Polyethylene | 0.3 | 1-methyl-2-heptadecyl-tetrahydropyrimidine. |
| 2 | do | 0.3 | 1-ethyl-2-heptadecyl-tetrahydropyrimidine. |
| 3 | do | 0.3 | Condensation product of palmitic acid and $H_2N-(CH_2)_3-NH(CH_2CH_2O)_{10}H$. |
| 4 | do | 0.3 | 1-pentyl-2-tridecyl-tetrahydropyrimidine. |
| 5 | do | 0.3 | 1-ethyl-2-hexyl-tetrahydropyrimidine. |
| 6 | do | 0.3 | Condensation product of oleic acid and $H_2N-(CH_2)_3-NH-(CH-CH_2O)_6H$. $\quad\quad\quad CH_3$ |
| 7 | do | 0.3 | 1-methyl-2-pentacosyl-tetrahydropyrimidine. |
| 8 | do | 0.3 | 1-ethyl-2-undecyl-tetrahydropyrimidine. |
| 9 | do | 0.3 | 1-butyl-2-$C_9$-to $C_{13}$-fatty alkyl-tetrahydropyrimidine. |
| 10 | do | 0.3 | 1-hydroxyethyl-2-undecyl-tetrahydropyrimidine. |
| 11 | do | 0.3 | 1-methyl-2-tridecyl-tetrahydropyrimidine. |
| 12 | do | 0.3 | Salt of 1-ethyl-2-undecyl-tetrahydropyrimidine and lactic acid. |
| 13C | do | 0.3 | Dodecyl-N, N-dihydroxyethylamine. |
| 14C | do | 0.3 | Hexyl-N, N-dihydroxyethylamine. |
| 15C | do | 0.3 | Tetracosyl-N,N-dihydroxyethylamine. |
| 16C | do | 0.3 | 2-undecyl-oxazoline. |
| 17C | do | 0.3 | 1-ethyl-2-tetracosyl-imidazoline. |
| 18C | do | 0.3 | Dodecyloxypropyl-N,N-dihydroxyethylamine. |
| 19C | do | 0.3 | Without additive. |
| 20 | Polypropylene | 0.5 | 1-butyl-2-undecyl-tetrahydropyrimidine. |
| 21 | do | 0.5 | 1-ethyl-2-undecyl-tetrahydropyrimidine. |
| 22 | do | 0.5 | Salt of 1-hydroxyethyl-2-tridecyl-tetrahydropyrimidine and lauric acid. |
| 23 | do | 0.5 | 1-ethyl-2-heptadecyl-tetrahydropyrimidine. |
| 24C | do | 0.5 | Dodecyloxypropyl-N,N-dihydroxyethylamine. |
| 25C | do | 0.5 | Without additive. |
| 26 | Polybutene-1 | 0.5 | 1-hydroxyethyl-2-undecyl-tetrahydropyrimidine. |
| 27 | do | 0.5 | 1-ethyl-2-undecyl-tetrahydropyrimidine. |
| 28 | do | 0.5 | 1-methyl-2-$C_{13}$- to $C_{17}$-fatty alkyl-tetrahydropyrimidine. |
| 29 | do | 0.5 | 1-butyl-2-$C_9$- to $C_{13}$-fatty alkyl-tetrahydropyrimidine. |
| 30C | do | 0.5 | Dodecyloxypropyl-N,N-dihydroxyethylamine. |
| 31C | do | 0.5 | Without additive. |

[1] C=Comparison example.

TABLE II

| No.[1] | Ash test after 1 hour | Ash test after 24 hours | Ash test after 8 days | Normal dust accumulation after 8 days | Color powder test—Measure: "color separation" after— 1 hour | 24 hours | 8 days |
|---|---|---|---|---|---|---|---|
| 1 | (−) | + | + | Very light | Light | Very light | None. |
| 2 | (−) | + | + | do | do | do | Do. |
| 3 | (−) | (+) | + | Light | Medium | Light | Very light. |
| 4 | (+) | + | + | None | Very light | None | None. |
| 5 | (−) | (+) | + | Light | Medium | Light | Very light. |
| 6 | (−) | (+) | + | do | do | do | Do. |
| 7 | (−) | (+) | + | do | do | do | Do. |
| 8 | + | + | + | None | None | None | None. |
| 9 | (+) | + | + | do | Very light | do | Do. |
| 10 | + | + | + | do | None | do | Do. |
| 11 | + | + | + | do | do | do | Do. |
| 12 | (+) | + | + | do | Very light | do | Do. |
| 13C | − | + | + | Very light | Medium | Light | Do. |
| 14C | − | − | (−) | Strong | Strong (*) | Strong | Medium. |
| 15C | − | − | (−) | Strong (*) | Strong (*) | do | Do. |
| 16C | − | (−) | (+) | Light | do | Medium | Light. |
| 17C | − | + | + | Very light | Medium | Light | None. |
| 18C | − | + | + | None | do | Very light | Do. |
| 19C | − | − | − | Very strong (*) | Very strong (*) | Very strong (*) | Very strong (*). |
| 20 | (+) | + | + | None | Very light | None | None. |
| 21 | + | + | + | do | None | do | Do. |
| 22 | (−) | + | + | do | Very light | do | Do. |
| 23 | (−) | + | + | do | Light | Very light | Do. |
| 24C | − | + | + | do | Medium | do | Do. |
| 25C | − | − | − | Very strong (*) | Very strong (*) | Very strong (*) | Very strong (*). |
| 26 | + | + | + | None | None | None | None. |
| 27 | + | + | + | do | do | do | Do. |
| 28 | (−) | + | + | Very light | Light | Very light | Do. |
| 29 | (+) | + | + | None | do | do | Do. |
| 30C | − | + | + | do | do | do | Do. |
| 31C | − | − | − | Very strong (*) | Very strong (*) | Very strong (*) | Very strong (*). |

[1] C = Comparison example.

TABLE III
Surface Resistance (MΩ)—45–50% Relative Atmospheric Humidity

| Example[1] | 1 hour | After 24 hours | 8 days |
|---|---|---|---|
| 1 | $9\times10^5$–$2\times10^6$ | $8\times10^5$–$2\times10^6$ | $6$–$7\times10^5$ |
| 2 | $1$–$3\times10^6$ | $7$–$9\times10^5$ | $4$–$7\times10^5$ |
| 3 | $4$–$6\times10^6$ | $8$–$9\times10^5$ | $3$–$7\times10^5$ |
| 4 | $7$–$8\times10^5$ | $7$–$9\times10^4$ | $2$–$4\times10^4$ |
| 5 | $1$–$2\times10^6$ | $5$–$7\times10^5$ | $1\times10^5$ |
| 6 | $7$–$8\times10^6$ | $3$–$4\times10^5$ | $5$–$7\times10^5$ |
| 7 | $3$–$4\times10^6$ | $4$–$7\times10^5$ | $9\times10^4$–$2\times10^5$ |
| 8 | $8$–$9\times10^4$ | $7$–$8\times10^3$ | $2$–$4\times10^3$ |
| 9 | $6$–$9\times10^5$ | $8$–$9\times10^4$ | $3$–$5\times10^4$ |
| 10 | $1$–$3\times10^5$ | $2$–$3\times10^4$ | $6$–$9\times10^3$ |
| 11 | $9\times10^4$–$2\times10^5$ | $9\times10^3$–$2\times10^4$ | $5$–$7\times10^3$ |
| 12 | $6$–$9\times10^5$ | $7$–$9\times10^4$ | $4$–$5\times10^4$ |
| 13C | $>10^7$ | $7\times10^4$–$5\times10^5$ | $2$–$3\times10^4$ |
| 14C | $>10^7$ | $>10^7$ | $2$–$6\times10^6$ |
| 15C | $>10^7$ | $>10^7$ | $9\times10^5$–$5\times10^6$ |
| 16C | $>10^7$ | $>10^7$ | $4$–$9\times10^4$ |
| 17C | $>10^7$ | $7\times10^4$–$5\times10^5$ | $1$–$2\times10^4$ |
| 18C | $>10^7$ | $6\times10^4$–$2\times10^5$ | $8$–$9\times10^3$ |
| 19C | $>10^7$ | $>10^7$ | $>10^7$ |
| 20 | $2$–$3\times10^5$ | $8$–$9\times10^4$ | $3$–$6\times10^4$ |
| 21 | $9\times10^4$–$1\times10^5$ | $1$–$3\times10^4$ | $5$–$7\times10^3$ |
| 22 | $6$–$7\times10^5$ | $4\times10^4$–$1\times10^5$ | $2$–$3\times10^4$ |
| 23 | $7$–$9\times10^5$ | $2$–$3\times10^5$ | $4$–$5\times10^4$ |
| 24C | $>10^7$ | $2$–$3\times10^5$ | $3$–$4\times10^4$ |
| 25C | $>10^7$ | $>10^7$ | $>10^7$ |
| 26 | $2$–$3\times10^5$ | $5$–$8\times10^4$ | $1$–$2\times10^4$ |
| 27 | $1$–$2\times10^5$ | $1$–$5\times10^4$ | $9\times10^3$–$1\times10^4$ |
| 28 | $8$–$9\times10^5$ | $2$–$5\times10^5$ | $8$–$9\times10^4$ |
| 29 | $5$–$6\times10^5$ | $9\times10^4$–$3\times10^5$ | $6$–$7\times10^4$ |
| 30C | $>10^7$ | $7$–$9\times10^4$ | $1$–$3\times10^4$ |
| 31C | $>10^7$ | $>10^7$ | $>10^7$ |

[1] C = Comparative example.

TABLE IV
Summary evaluation of the antistatic effectiveness after—

| Number[1] | 1 hour | 24 hours | 8 days |
|---|---|---|---|
| 1 | Medium | Good | Good. |
| 2 | do | do | Do. |
| 3 | do | do | Do. |
| 4 | Good/medium | do | Very good. |
| 5 | Medium | Medium | Good. |
| 6 | do | Medium | Do. |
| 7 | do | Good | Do. |
| 8 | Good | do | Very good. |
| 9 | Good/medium | do | Do. |
| 10 | Good | do | Do. |
| 11 | do | do | Do. |
| 12 | Good/medium | Good | Do. |
| 13C | Medium | do | Do. |
| 14C | Very bad | Very bad | Medium. |
| 15C | do | do | Do. |
| 16C | do | Bad | Good. |
| 17C | Medium/bad | Good | Very good. |
| 18C | do | do | Do. |
| 19C | (2) | | |
| 20 | Good/medium | Good | Very good. |
| 21 | Good | Very good | Do. |
| 22 | Medium | Good | Do. |
| 23 | do | do | Do. |
| 24C | Medium/bad | do | Do. |
| 25C | (2) | | |
| 26 | Good | Very good | Very good. |
| 27 | do | do | Do. |
| 28 | Medium | Good | Good. |
| 29 | Good/medium | do | Very good. |
| 30C | Medium/bad | do | Do. |
| 31C | (2) | | |

[1] C = Comparison example.
[2] Without additive, no effect.

The antistatic behavior of the filaments and fibers was also tested by the ash dust method and by measuring the surface resistance in accordance with German Industrial Standard DIN 53,482 VDE 0303, Part 3. These tests were conducted on polyolefin strands of 10 g. reeled off from the spinning reels.

In the following examples, the disclosed amounts of 1-ethyl-2-undecyl-tetrahydropyrimidine was, in each case, admixed to 2 kg. of isotactic polypropylene powder having the relative viscosity of 2.0 (c.=0.1 g./100 ml. at 135° C. in decahydronaphthalene), and the thus-obtained powder is granulated in an extruder. In the comparative examples, a corresponding procedure was carried out with the bishydroxyethyl derivative of lauryloxypropylamine.

The thus-obtained granulated material was spun into threads in a melt spinning apparatus at 245–295° C. by melting and extrusion through an eight-hole nozzle (diameter of the holes: 0.25 mm.), which threads were wound onto spools. From the thus-obtained spools, 10-gram strands were wound off, and the surface resistance was measured by means of a "Tera" ohmmeter (Kamphausen; electrode gap: 1 cm.). The attraction of cigarette ash (ash test) was measured (after a 24-hour storage at 23° C., 60% relative humidity) after rubbing with a cellulose cloth (height: 0.5 cm. above the ash). Polyolefin threads and fibers which do not contain any antistat exhibit a surface resistance of $>10^7$ MΩ and strongly attract the ash. − means ash attraction; + means no ash attraction.

Examples 32 to 35

In Examples 32–35, the indicated amount of 1-ethyl-2-undecyltetrahydropyrimidine (EUTP) is, in each case, admixed to isotactic polypropylene powder having the relative viscosity of 2.0. The powder is then granulated and spun in a melt spinning apparatus.

Data of the melt spinning plant:

Melting zone:
```
    1 _____ °C__   245
    2 _____ °C__   265
    3 _____ °C__   295
Extrusion speed _____ m./min__  16-18
Conveying capacity _____ g./min__  5.8-6.3
Spinning delay _____  35-37
Winding speed _____ m./min__   640
```

The properties of the thus-produced filaments are set forth below.

| | Added amount of EUTP (percent by wt.) | Fineness of thread (titer) [$d_{tex.}$][1] | Tensile elongation, percent (tensile strength [$p/d_{tex.}$])[2] | Surface resistance [MΩ] | Ash test |
|---|---|---|---|---|---|
| Example 32___ | 0.3 | 95/8 | 348 (1.4) | $6.10^4$ | + |
| Example 33___ | 0.5 | 96/8 | 417 (1.2) | $3.10^4$ | + |
| Example 34___ | 1.0 | 99/8 | 421 (1.3) | $4.10^3$ | + |
| Example 35___ | 4.5 | 97/8 | 329 (1.0) | $3.10^3$ | + |

[1] $d_{tex.}$ means the weight of 10,000 m. fibre in g.

[2] $p/d_{tex.} = \frac{pond}{d_{tex.}}$

Comparative Examples 36 to 39

In comparative Example 36, isotactic polypropylene (relative viscosity=2.0) is spun without any additive, and in Comparative Examples 37 and 39, the same isotactic polypropylene is mixed with the disclosed amounts of the additive bishydroxyethyl derivative of lauryloxypropylamine (BHLP) and then spun, under otherwise identical conditions.

| | Added amount of BHLP [Percent by wt.] | Fineness of thread (titer) [$d_{tex.}$] | Tensile elongation, percent (tensile strength [$P/d_{tex.}$]) | Surface resistance [MΩ] | Ash test |
|---|---|---|---|---|---|
| Comp. Ex. 36_ | 0 | 95/8 | 417 (1.6) | $>10^7$ | — |
| Comp. Ex. 37_ | 0.5 | 101/8 | 408 (1.2) | $>10^7$ | — |
| Comp. Ex. 38_ | 1.0 | 100/8 | 368 (1.3) | $3.10^5$ | + |
| Comp. Ex. 39_ | 4.5 | 99/8 | 311 (1.0) | $7.10^4$ | + |

The comparative examples demonstrate that an antistat (BHLP) highly effective for injection-molded articles of polyolefins cannot be economically employed for threads and fibers, since the onset of an antistatic effect can only be detected at a concentration of 1.0% (or higher). In contrast thereto, the antistatic polyolefin threads and fibers of this invention, surprisingly exhibit an improved effect with considerably smaller concentrations of the tetrahydropyrimidines of this invention, e.g., $6·10^4$ MΩ at 0.3% antistat concentration.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An antistatic solid poly-α-olefin composition containing 0.01–5.0% by weight, based on the poly-α-olefin, of a tetrahydropyrimidine of the formula:

$$R_2-C\underset{N-CH_2}{\overset{N-CH_2}{\diagup\diagdown}}CH_2 \quad |\quad R_1$$

wherein $R_1$ is hydrogen, alkyl or alkenyl of 1–5 carbon atoms, or a group of the formula $(C_xH_{2x}O)_nH$ in which $x$ is 2 or 3 and $n$ is 1–10; and $R_2$ is an alkyl or alkenyl of 5–25 carbon atoms.

2. A composition of claim 1 wherein the tetrahydropyrimidine is 1-hydroxyethyl-2-undecyl-tetrahydropyrimidine.

3. A composition of claim 1 containing 0.1–1.0% of the tetrahydropyrimidine.

4. A composition of claim 1 wherein $R_1$ is alkyl.

5. A composition of claim 4 wherein $R_2$ is alkyl.

6. A composition of claim 5 wherein $R_2$ is alkyl of 9–13 carbon atoms.

7. A composition of claim 6 wherein $R_2$ is undecyl.

8. A composition of claim 7 wherein the tetrahydropyrimidine is 1-ethyl-2-undecyl-tetrahydropyrimidine.

9. A composition of claim 1 wherein the poly-α-olefin is selected from the group consisting of polyethylenes of a molecular weight from 20,000 to 150,000, polypropylenes of molecular weights from 100,000 to 800,000, polybutenes-1 of molecular weights from 3000,000 to 3,000,000 polypentenes-1, copolymers of ethylene, propylene, butene-1 or pentene-1 with each other and mixtures thereof.

10. A composition according to claim 9 wherein the poly-α-olefin is an extrudable polyethylene.

11. A composition according to claim 9 wherein the poly-α-olefin is an extrudable polypropylene.

12. A composition according to claim 9 wherein the poly-α-olefin is an extrudable polybutene-1.

13. A process for imparting antistatic properties to solid poly-α-olefins which comprises incorporating therein from 0.01–5.0% by weight of tetrahydropyrimidine of the formula:

$$R_2-C\underset{N-CH_2}{\overset{N-CH_2}{\diagup\diagdown}}CH_2 \quad |\quad R_1$$

wherein $R_1$ is hydrogen, alkyl or alkenyl of 1–5 carbon atoms, or a group of the formula $(C_xH_{2x}O)_nH$ in which $x$ is 2 or 3 and $n$ is 1–10; and $R_2$ is an alkyl or alkenyl of 5–25 carbon atoms.

14. A process according to claim 13 wherein the tetrahydropyrimidine is 1-hydroxyethyl-2-undecyl-tetrahydropyrimidine.

15. A process according to claim 13 wherein the poly-α-olefin is selected from the group consisting of polyethylenes of a molecular weight from 20,000 to 150,000, polypropylenes of molecular weights from 100,000 to 800,000, polybutenes-1 of molecular weights from 300,000 to 3,000,000, polypentenes-1, copolymers of ethylene, propylene, butene-1 or pentene-1 with each other and mixtures thereof.

16. A process according to claim 15 wherein the poly-α-olefin is an extrudable polyethylene.

17. A process according to claim 15 wherein the poly-α-olefin is an extrudable polypropylene.

18. A process according to claim 15 wherein the poly-α-olefin is an extrudable polybutene-1.

19. A process according to claim 15 wherein $R_1$ is alkyl.

20. A process according to claim 19 wherein $R_2$ is alkyl.

21. A process according to claim 20 wherein $R_2$ is alkyl of 9–13 carbon atoms.

22. A process according to claim 21 wherein $R_2$ is undecyl.

23. A process according to claim 22 wherein the tetrahydropyrimidine is 1-ethyl-2-undecyl-tetrahydropyrimidine.

References Cited

UNITED STATES PATENTS

| 3,020,276 | 2/1962 | Hughes et al. | 252—8.8 |
| 3,210,312 | 10/1965 | Rosenberg et al. | 260—94.9 |

FOREIGN PATENTS

| 1,564,308 | 3/1969 | France. |
| 6512842 | 4/1966 | Netherlands. |

JAMES A. SEIDLECK, Primary Examiner

E. J. SMITH, Assistant Examiner

U.S. Cl. X.R.

260—88.2 S, 94.9 GB, 897 A, DIGEST 15, DIGEST 19